April 19, 1966 H. GOLDBERG ETAL 3,246,459
ROTARY MOWER RECEPTACLE SYSTEM
Filed March 19, 1964 3 Sheets-Sheet 1

INVENTORS
HARRY GOLDBERG
STANLEY Z. SIWEK
ATTORNEY

April 19, 1966 H. GOLDBERG ETAL 3,246,459
ROTARY MOWER RECEPTACLE SYSTEM
Filed March 19, 1964 3 Sheets-Sheet 2
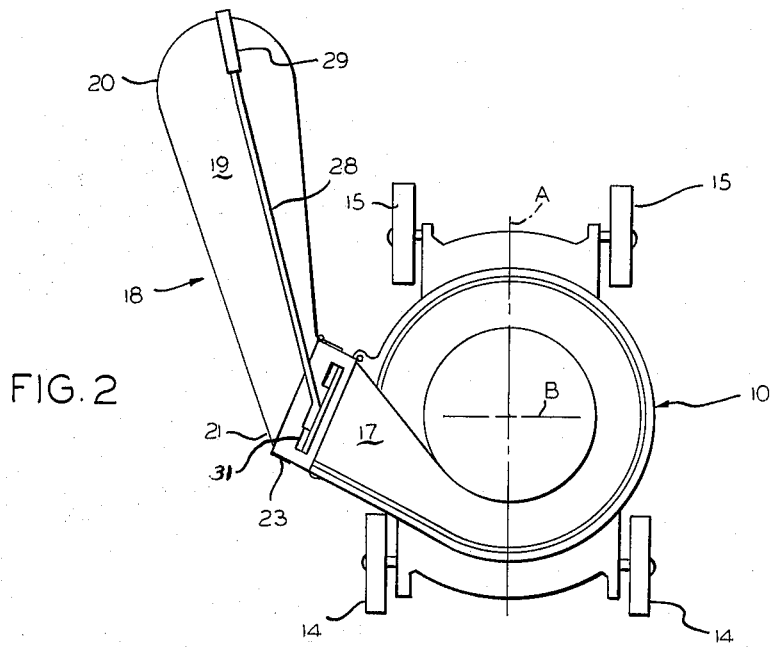
FIG. 2
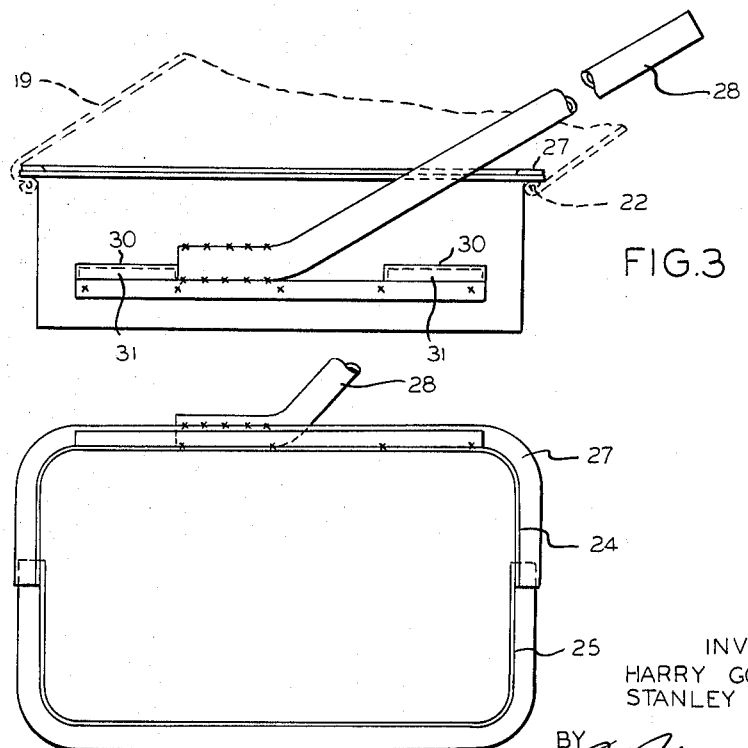
FIG. 3
FIG. 4
INVENTORS
HARRY GOLDBERG
STANLEY Z. SIWEK
BY
ATTORNEY April 19, 1966 H. GOLDBERG ETAL 3,246,459
ROTARY MOWER RECEPTACLE SYSTEM
Filed March 19, 1964 3 Sheets-Sheet 3

INVENTORS
HARRY GOLDBERG
STANLEY Z. SIWEK
BY
ATTORNEY

United States Patent Office 3,246,459
Patented Apr. 19, 1966

3,246,459
ROTARY MOWER RECEPTACLE SYSTEM
Harry Goldberg, Highland Park, and Stanley Z. Siwek, Chicago, Ill., assignors to Pioneer Gen-E-Motor Corporation, Chicago, Ill.
Filed Mar. 19, 1964, Ser. No. 353,086
4 Claims. (Cl. 56—202)

The present invention is directed to certain new and useful improvements in power-driven rotary mowers provided with receptacles for receiving clippings, cuttings and the like from the mower.

This general type of mower uses the rotation of the blade to both cut and to create a discharging wind stream from the mower and to the receptacle so that the clippings are elevated after being cut and propelled by the wind stream into the receptacle. It has been considered desirable to mount the receptacle at the side of such a mower and in communication with a side discharge for the reason that the clippings traverse a much shorter path in such a system as opposed to the longer paths the clippings take when discharged through the rear of a mower. Side-mounted receptacles create a lateral obstruction and, for this reason, it has been considered desirable to form such receptacles in such a way that they occupy a minimum of space at the side of the mower, thus enabling passage of the mower close to shrubbery, trees or other obstructions usually encountered when mowing a lawn. Especially formed receptacles in the form of especially curved bags or the use of especially curved discharge conduits between the receptacle and the discharge opening have been proposed in the past in an effort to dispose the receptacle alongside the mower and as close to the handle of the mower as possible. In the same class of mower, it is considered desirable to so form the mower itself and the receptacle attaching facilities as to have the best possible updraft and velocity of the wind stream created by the rotating blade, all to minimize dropping of clippings.

With the foregoing in mind, the major purposes of the present invention are to create a mower system of the foregoing class with simplified facilities for attaching a receptacle to the side discharge of the mower while enabling a longitudinal positioning of the receptacle and close to the mower handle, and so arrange the discharge of the mower with relation to the receptacle as to improve the efficiency of the clipping ejecting stream of air produced by the blade, all while utilizing simple and efficient means for attaching a receptacle in the form of a porous bag to a discharge chute of such a mower, these and other purposes being more apparent in the course of the ensuing specification and claims when taken with the accompanying drawings, in which:

FIGURE 2 is a plan view of the mower illustrated in FIGURE 1, with certain portions being omitted for purposes of clarity;

FIGURE 3 is a top view of a bag supporting frame utilized in the invention;

FIGURE 4 is a front view of the frame illustrated in FIGURE 3;

Like elements are designated by like characters throughout the specification and drawings.

Figure 1:
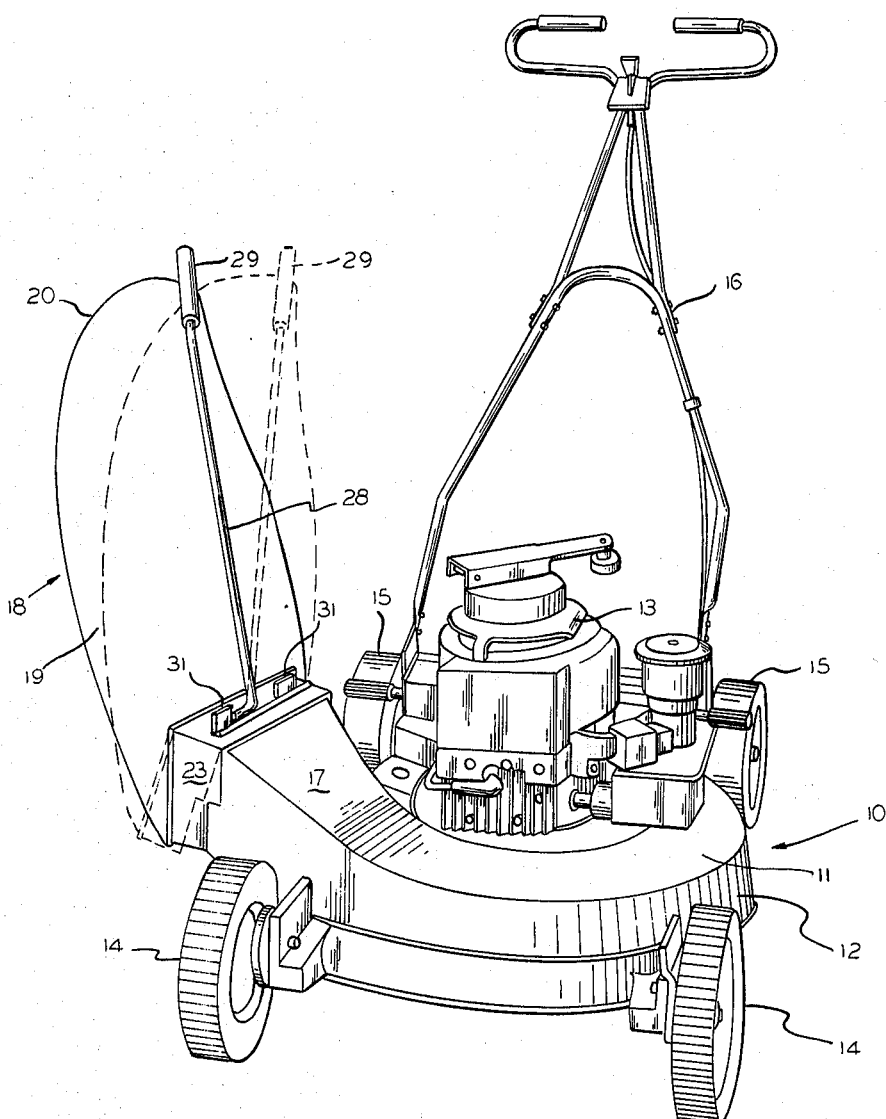
FIGURE 1 is a perspective view of a rotary mower embodying the principles of the present invention.

Referring specifically now to the drawings, and in the first instance to FIGURE 1, numeral 10 generally designates a wheel-supported, power-driven rotary mower. The mower includes a housing 11 provided with a down turned skirt 12 within which a rotary mower blade is adapted to rotate about a vertical axis as defined by the drive shaft of an engine 13 which is mounted on top of the housing 11. The mower may be provided with the usual front and rear wheels 14 and 15 and have a handle mounted on the rear of the mower as at 16 and inclined upwardly and rearwardly therefrom. Mowers of this class may be provided with self-propelling mechanism or may be hand-propelled as desired.

In accordance with the present invention, the mower housing 11 is provided with a side discharge opening which is defined at the end of a channel which is formed spirally about the vertical axis of the drive shaft of the engine. This channel terminates in an enlarged discharge defining chute 17, the top wall of which is inclined upwardly and outwardly with respect to the mower. The end of the channel 17, as defined by its outer edge 17a, is formed in a generally vertical plane which extends at an inclination to the longitudinal axis of the mower and at an inclination to the transverse axis of the mower.

A receptacle, generally designated at 18, is detachably coupled to the discharge chute. The receptacle may take the form of a porous cloth bag 19. Bags of this general type have been in use with mowers for many years.

Bag 19 is formed as an ordinary bag having a rounded outer end 20 and an inner end 21 which defines an inlet or inlet mouth of the bag. The inlet mouth is formed by cutting the bag on a bias or a diagonal with respect to the longitudinal axis of the bag and with the substantial part of the opening being positioned laterally of the longitudinal axis. The bag fabric at this mouth end is then hemmed so as to include a drawstring 22. In lieu of a drawstring, and endless elastic cord may be used.

Figure 5:
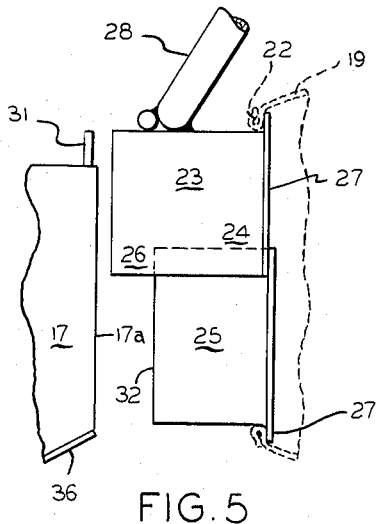
FIGURE 5 is a side view of the bag attachment illustrated in FIGURES 3 and 4, while illustrating its relation to the discharge chute of the mower.

The mouth end of the bag is adapted to be fixed to a boxlike frame 23 which in turn is adapted to be coupled to the discharge chute of the mower. Frame 23 may be defined by overlapping generally U-shaped plates 24 and 25, respectively, which appear in FIGURES 3, 4 and 5 so as to define a generally rectangular enclosure. The uppermost plate 24 has a greater width than the lowermost portion 25, as is seen in FIGURE 5, so that it represents a projecting hooklike portion 26 which may overlie the upper wall and upper portions of the side walls of the discharge chute 17.

Frame 23 may have a bead or rim 27 formed therearound so that the mouth end of the bag may be positioned over this bead or rim and the drawstring 22 pulled tight so as to hold the bag, in removable fashion, on the frame 23. When an elastic cord is used, it is to fit the mouth end over the rim 27 and then allowed to snap back to resiliently embrace the frame. Frame 23 has a supporting rod 28 welded to the top wall thereof and extending upwardly and rearwardly with respect to the frame, as appears in FIGURES 1 through 5 inclusive. Bag 19 has a cloth socket 29 sewn thereto at the rear portion thereof so as to removably receive the rear end of the rod. The arrangement is such that, when the drawstring 22 is pulled tight on the bag frame, the rod holds the bag 19 in an extended position, as appears in FIGURES 1 and 2. The bag 19 and frame 23 may be handled as a unit merely by grasping the rod 28.

If desired, bag 19 may have an opening in the rearward portion thereof, which opening may be closed by any suitable means, as by a zipper, so as to provide a discharge opening from the bag. Also, if desired, bag 19 may be provided with screenlike sections in various portions thereof so as to enhance the airflow through those sections, all for the purpose of improving the airflow through the bag and the deposit of clippings at all portions of the bag.

Frame 23 is detachably coupled to the discharge chute; for example, frame 23 may have slots 30 in the upper wall of the section 24, which slots are adapted to receive upstanding ears 31 on the top wall of the discharge chute. Thus the frame and bag may be positioned on the mower by placing the frame in overlying relation to the discharge chute and engaging the ears 31 within the slots 30. When so positioned, lateral or outward movement of the bag is prevented by the slot and ear engagement. Inward movement is prevented by abutment of the inner edges 32 of the lower portion 25 of the frame with the outer edges of the discharge chute 17. The bag and frame are thus held on the discharge chute and disposed laterally and readwardly of the chute. It may be noted that the disposition of the bag 19 is such that it is inclined slightly to the longitudinal axis designated at A in FIGURE 2 but that the angle is relatively slight as compared with the angle which the bag makes with the transverse axis B of the mower.

Preferably, the slots 30 in the frame have widths which are slightly greater than the widths of the ears by an amount, as indicated in FIGURE 3, such as to allow swinging movement of the boxlike frame and bag about the upper wall of the channel as a pivot and to a position where the bag is immediately adjacent the handle, all without binding of the ears within the slots. The height of the ears permits this movement without disengagement of the frame from the mower channel.

This mounting allows the bag to move inwardly in the event a lateral obstruction is encountered. The bag may swing downwardly to the normal position by gravity when the obstruction has been passed.

Figure 6:
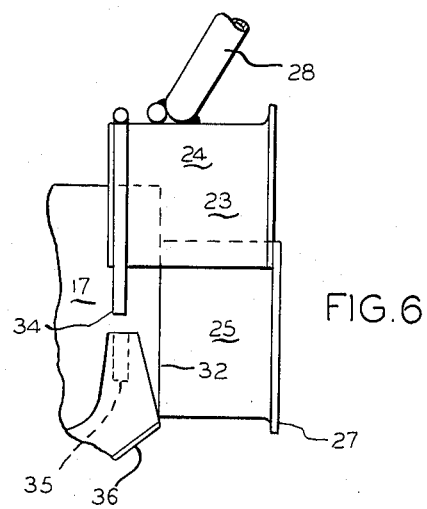
FIGURE 6 is a rear view of a bag supporting frame similar to that of FIGURES 3, 4 and 5 but utilizing different means for coupling the frame to the discharge chute of the mower.

The bag frame 23 may be removably or detachably coupled to the mower by other means; for example, supporting legs 34 may be positioned on the outer portions of the upper plate 24 of the frame 23 and positioned to engage or to be received within sockets 35 which are spaced inwardly from the outermost portion of the discharge chute 17 and spaced inwardly from the abutting portion 32 of the frame, all as is seen in FIGURE 6. Engagement of the bag frame with the discharge chute is similar to that of FIGURE 5 in that the upper frame portion 24 is positioned in overlying relation to the end of the discharge chute 17, and with the legs 34 aligned with the sockets 35, whereupon downward movement engages the legs 34 within the socket so as to removably hold the bag frame in position.

In order to improve the airflow from the discharge chute, a plate 36 is positioned in engagement with the lower edges of the walls defining the discharge chute or channel so as to close the otherwise downwardly open chute, at the outer portion thereof. Plate 36 is provided with an upwardly inclined outer portion 37 which is of generally uniform width extending across the outermost portion of the discharge chute at the bottom thereof. Plate 26 includes an inner portion 38 which extends generally parallel to the wheel axes (or horizontally) and inwardly from the outer portion 37. Portion 38 is bounded by one edge 39 which extends along the forward wall of the channel of the discharge chute. Portion 38 is also defined by an inner edge 40 which is formed in curvilinear fashion and concentric with the outer edge of the blade path 41 and extending from a forward point adjacent the skirt to a point of mergence with the inclined portion 37.

The inner edge of plate portion 38 is positioned slightly below and slightly outwardly of the curvilinear path traversed by the outer end of the blade. The spacing may be approximately one-fourth inch. The blade, which is inclined so as to produce both a lifting action on air and clippings beneath the housing as well as an outwardly directed force due to centrifugal forces, produces some upwardly directed suction force beneath the plate 36, since the outwardly passing air stream above the plate 36 tends to pull clippings and air beneath the plate past the inner edge of the plate and into the discharge stream.

A bonding edge 42 extends between the two boundary defining edges 40 and 39 of plate portion 38 at a point well inwardly of the line 37A which divides the portions 37 and 38 of the plate. The edge 42 is positioned at a point adjacent to the skirt 12 of the mower on the discharge side.

Figure 10:
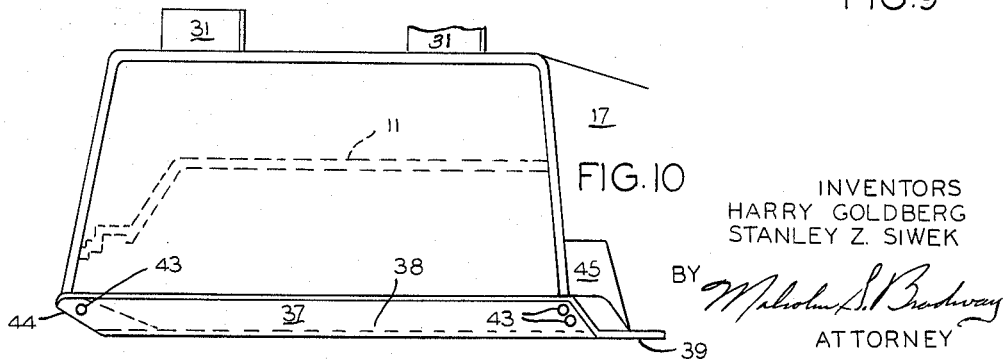
FIGURE 10 is a diagrammatic view illustrating the plate element of FIGURES 8 and 9 to the discharge channel of the mower.

Plate 36 may be fixed in position by means of bolts passed through apertures 43 at suitable locations of the plate and into the downwardly facing edges of the walls defining the discharge channel, which walls are indicated at 44 and 45 in FIGURE 10.

Figure 7:
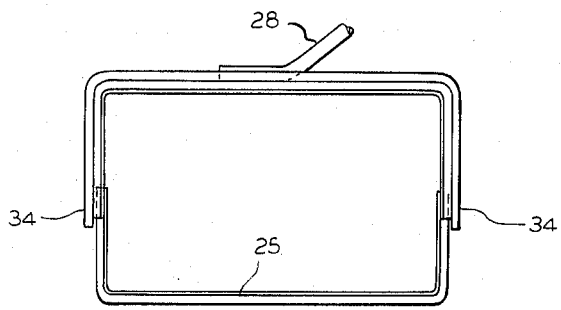
FIGURE 7 is a side view of the frame illustrated in FIGURE 6.
Figures 8, 9:
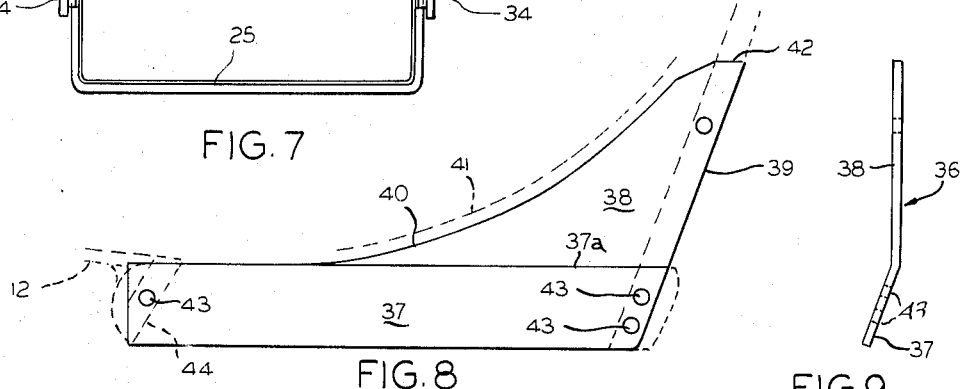
FIGURE 8 is a plan view of a closure plate used with the discharge channel or chute of the mower of the present invention.
FIGURE 9 is an end view of the plate illustrated in FIGURE 8.

Discharge and receptacle systems, as defined herein, are easily formed with simple elements, all while providing a substantially rearward disposition of a collecting bag. Bag 19 is formed as a simple and standard bag, but by use of the bias cut at the mouth end of the bag and the rearward direction of the discharge chute, the bag is disposed more nearly longitudinally of the mower than transversely. The bag is easily attached to and detached from the mower by simply manipulating the bag through the rod 28 which serves as a handle for the receptacle. The bag is attached to the discharge chute by positioning the bag frame in overlying relation thereto and moving the frame downwardly so as to engage the ears and slots of FIGURES 3, 4 and 5 or the legs and sockets of FIGURES 6 and 7.

If for any reason the bag becomes worn, it may be replaced simply by loosening the drawstring, removing the old bag 19, and positioning a new bag in place by fixing the drawstring thereof to the frame and with the cloth socket 29 of the new bag engaged with the end of rod 28.

Plate 36 acts as a combined guard and deflector plate to improve the discharging process of the mower. It may be noted that by positioning the plate 36 at the outer end of the discharge chute, plate 36 tends to prevent movement of a person's foot within the area of the otherwise downwardly open discharge channel. Portion 37 of the plate, which is inclined upwardly and outwardly with respect to the discharge chute, serves to deflect clippings passing outwardly through the chute, along a path which is upwardly with respect to the channel. Plate portion 38 improves the blade suction and prevents downdrafts at this point within the discharge channel. By having the outer end of the blade pass above and inwardly of the arcuate bounding edge 40 of this plate portion, the blade produces increased suction at this point.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:

1. A rotary mower including a downwardly open housing having cutting means disposed therewithin, means in said housing defining a guiding channel extending from the forward portion of said housing to a lateral portion thereof, said channel defining means terminating in an opening directed laterally and rearwardly with respect to said housing, said opening being defined by marginal edges of said channel defining means, said edges lying in a general plane which is inclined to the forward to rear axis of said housing, and facing laterally and rearwardly, a porous bag having an inlet opening formed around a longitudinal axis of said bag, said inlet opening being defined in a plane intersecting said longitudinal axis and inclined thereto, said bag being cut on a bias to provide said inlet opening, a reinforcing frame formed around said bag inlet opening, a supporting rod fixed to said frame and extending to the rear of said bag and connected therewith, and interengageable leg means and socket means carried by said channel and said frame for connecting said bag to said channel, one of said leg means and socket means being on said channel while the other is on said frame, said leg means extending generally vertically when said frame is connected to said channel to thereby detachably connect said bag to said channel and with said openings in communication with one another, whereby the combined directions of said channel opening and bag inlet opening dispose the longitudinal axis of said bag more nearly parallel to the longitudinal axis of said housing than to the transverse axis thereof.

2. The structure of claim 1 wherein spaced upstanding legs are positioned on said channel and spaced openings are formed in said frame so as to define said leg and socket means.

3. The structure of claim 1 wherein said leg and socket means are defined by spaced rods carried by said frame and spaced sockets on opposite sides of said channel.

4. The structure of claim 1 wherein said socket means are slightly larger than said leg means so that when said leg and socket means are engaged, said bag and frame may rock upwardly with respect to said channel.

References Cited by the Examiner

UNITED STATES PATENTS

| | | | |
|---|---|---|---|
| 2,855,744 | 10/1958 | Phelps | 56—202 |
| 2,932,146 | 4/1960 | Campbell | 56—202 |
| 3,047,998 | 8/1962 | Leader et al. | 56—202 |
| 3,112,598 | 12/1963 | Heth et al. | 56—202 |
| 3,165,877 | 1/1965 | Leader et al. | 56—202 |

ABRAHAM G. STONE, *Primary Examiner.*

ANTONIO F. GUIDA, *Examiner.*

J. O. BOLT, *Assistant Examiner.*